(No Model.) 3 Sheets—Sheet 1.
F. WISWALL & W. H. COLLIER.
CONSTRUCTION OF RIVER AND OTHER WEIRS AND SLUICE GATES.
No. 281,599. Patented July 17, 1883.
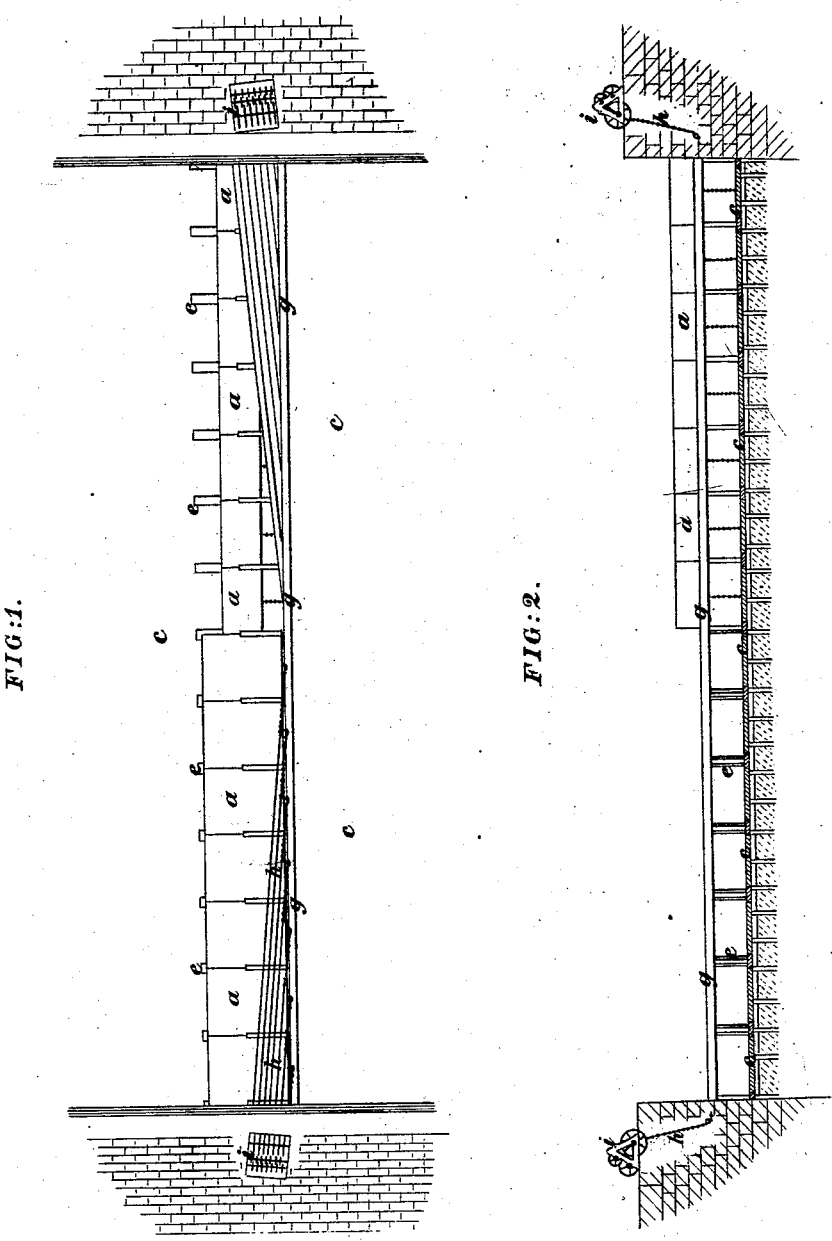

(No Model.) 3 Sheets—Sheet 2.
F. WISWALL & W. H. COLLIER.
CONSTRUCTION OF RIVER AND OTHER WEIRS AND SLUICE GATES.
No. 281,599. Patented July 17, 1883.
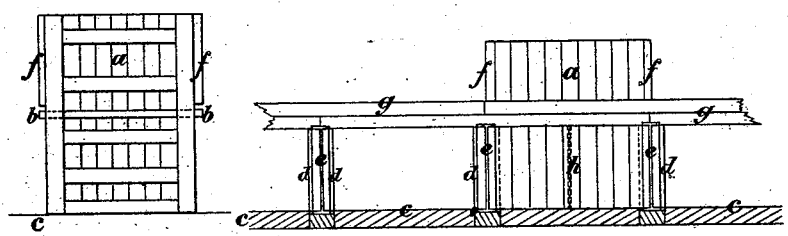

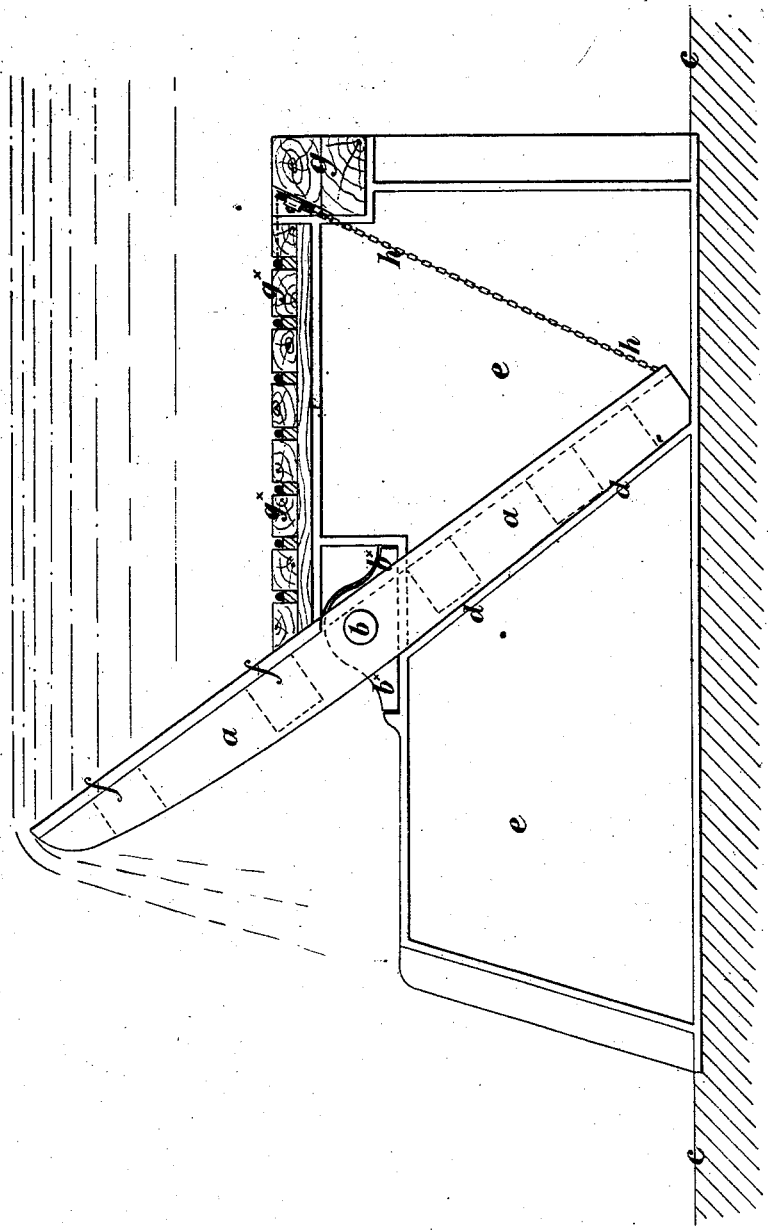

UNITED STATES PATENT OFFICE.

FRANCIS WISWALL AND WILLIAM H. COLLIER, OF MANCHESTER, COUNTY OF LANCASTER, ENGLAND.

CONSTRUCTION OF RIVER AND OTHER WEIRS AND SLUICE-GATES.

SPECIFICATION forming part of Letters Patent No. 281,599, dated July 17, 1883.

Application filed August 14, 1882. (No model.)

*To all whom it may concern:*

Be it known that we, FRANCIS WISWALL and WILLIAM HENRY COLLIER, both residing in Manchester, in the county of Lancaster, England, and subjects of the Queen of Great Britain and Ireland, have invented Improvements in the Construction of River and other Weirs and Sluice-Gates, of which the following is a specification.

The object of this invention is to so construct weirs and sluice-gates for navigable rivers and other purposes that they shall be self-acting and open automatically whenever the water rises above its normal level, or above a certain defined limit, and thus allow the water to escape in time of floods, and at the same time to provide means whereby one or more of the sluice-gates of a weir can be opened from the banks whenever circumstances render it desirable.

In the annexed drawings, Figure 1 represents a plan view, and Fig. 2 a sectional elevation, of a river-weir constructed according to our invention, the right-hand half being represented as with the sluice-gates closed and the left-hand half with the gates open. Fig. 3 is a back view of a single sluice or flood gate. Fig. 4 is a front elevation of a sluice, showing part of the tie-beam and three of the upright piers. Fig. 5 is an enlarged section, showing a side view of one of the piers, with the sluice or flood gate closed and the water just flowing over the top; Fig. 5*, a similar view drawn to a larger scale. Fig. 6 is a reversed view with the sluice or flood gate open or in the horizontal position, showing also a front view of the multiple crab; and Fig. 7 is a plan view of the multiple crab, (enlarged.)

Our improved weir consists, principally, of a series of rectangular sluice-gates, *a a*, extending in a line across the river, and capable of turning or tilting near their center on a common horizontal axis at *b b*. (See also enlarged detail views, Figs. 3 to 7.) When closed, the gates *a a* are inclined at an angle of about thirty-five degrees, (see Figs. 5 and 5*,) and when open they are suspended in a horizontal plane in a line with their common axis. (See Fig. 6.) Each gate is independent of all the others.

We are aware that it has been proposed to construct a weir of a series of gates turning on centers; but the difficulty of bringing their edges into water-tight contact has hitherto prevented the practical application of the idea.

It is obvious that round three of its edges each gate *a a* must make a water-tight joint, and this we effect in the following manner: The lower edge is made to rest upon a prepared level bed, *c c*. The side edges below the axis rest against projecting flanges or ribs *d d* on the upright piers or frames *e e*, which support the gates, and the side edges, *f f*, above the axis *b b* are made rather wider, and fit edge to edge. The bearings *b**, Fig. 5*, for the pivots are made of such a size and width as to fill up the space exactly. This is the only point where there is any friction at the edges of the sluices. A tie-beam, *g g*, runs from shore to shore, and connects all the upright piers at the top together at the same time that it protects the edges of the sluices when open from damage by floating matter.

The position of the axis of the gates is such that the pressure of the water, while at its normal level, keeps them in their inclined or closed position, Fig. 5, and thus impounds the water for the purposes of agriculture, manufactures, or navigation, the surplus water flowing over the top or crest of the gates; but as soon as the level of the water rises above certain defined limits, the pressure of the same against that part of the area of the gates *a a* above the center axis, *b b*, becomes increased, so that the gates are thereby tilted automatically into the horizontal position shown in Fig. 6, and thus allow of the free flow of the flood-water, the backwater below the gates acting in the reverse direction against that portion of the same below the axis, and assisting in the tilting operation.

It will be evident that as the river-bed is quite level and unobstructed by any sill or chamber there is no tendency to catch silt or other matter in suspension; and as the edges of the gates are presented to the stream, and as there is an absence of all head-gear, the water and all floating matter is uninterrupted in its passage. As soon as the flood has subsided and the stream falls to its normal level, the pressure upon the upper part of the sluices becomes reduced, and they fall back into their inclined or closed position, Fig. 5, by the joint action of their own weight, assisted by the pressure of the stream on the lower part below the axis. The automatic action of the sluice-gates $a\,a$, though valuable as a safeguard in times of sudden floods, is not always desirable, as the sudden discharge of a great body of water might cause serious erosion of the river-banks. We therefore provide draw-chains $h\,h$, worked by multiple crabs $i\,i$, (see also enlarged plan, Fig. 7,) whereby any one or more of the sluice-gates can be opened at will from the banks, and the impounded water thus gradually released. Each chain is fastened to its own respective gate, and passes round guide-pulleys to its own barrel on the multiple crab $i\,i$, and for each chain-barrel there is provided a sliding pinion, by means of which it can be thrown into or out of gear with the first motion shaft, to which the handles $k\,k$ are attached.

$l\,l$ (see Fig. 7) are levers by means of which the sliding pinions can be thrown into and out of gear.

The chains are conducted each from its respective barrel on the multiple crab by a series of grooved guide-pulleys placed in such positions as may be necessary to conduct the chain round any angles or corners that have to be passed in its progress from one to the other.

The horizontal portion, which lies between the masonry on each side and the last pulley over which it turns to be attached to the gate, runs in grooves between planking $g^\times\,g^\times$. (Shown in section in Figs. 5 and 6, and in plan view at the right-hand side in Fig. 1.) This middle portion may be principally in the form of a rod, in which case it would be supported upon hardwood chocks, (instead of pulleys,) as shown in Fig. 5*.

We claim as our invention—

1. The combination of a self-acting sluice or flood gate pivoted near its center, and upright piers having inclined projecting flanges or ribs, against which the sides of the gate are adapted to close to make a water-tight joint, with a tie-beam, $g$, connecting the said piers together at the top, and forming a protection for the lower edge of the gate when raised or open, substantially as set forth.

2. A weir consisting of a series of flood-gates arranged side by side, and combined with piers having a corresponding series of inclined projecting flanges or ribs, against which the sides of the several gates are adapted to close to make a water-tight joint, substantially as described.

3. The combination of a weir, consisting of a series of upright piers and sluice-gates pivoted thereto near their centers, with a tie-beam, $g$, connecting all the piers at the top, and forming a protection for the lower edges of the gates when raised, substantially as specified.

4. The combination of a series of pivoted sluice-gates of a weir with corresponding draw-chains, and a multiple crab having a separate chain-barrel for each draw-chain, and a separate sliding pinion for each barrel, and a driving-shaft with which each barrel may be thus thrown into gear, substantially as set forth.

In testimony whereof we have signed our names to this specification in the presence of two subscribing witnesses.

FRANCIS WISWALL.
W. H. COLLIER.

Witnesses:
GEORGE DAVIES,
CHARLES DAVIES.